(12) United States Patent
Kawakami

(10) Patent No.: US 7,576,309 B2
(45) Date of Patent: *Aug. 18, 2009

(54) ILLUMINATING DEVICE, ELECTRO-OPTICAL DEVICE, AND ELECTRONIC APPARATUS

(75) Inventor: Hisanori Kawakami, Matsumoto (JP)

(73) Assignee: Epson Imaging Devices Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/012,982

(22) Filed: Feb. 4, 2008

(65) Prior Publication Data

US 2008/0142682 A1 Jun. 19, 2008

Related U.S. Application Data

(62) Division of application No. 11/697,494, filed on Apr. 6, 2007.

(30) Foreign Application Priority Data

Apr. 13, 2006 (JP) ............................. 2006-110916

(51) Int. Cl.
*G01J 1/32* (2006.01)
(52) U.S. Cl. .................... 250/205; 250/227.14; 315/151
(58) Field of Classification Search ................. 250/205, 250/227.14; 315/151
See application file for complete search history.

(56) References Cited

U.S. PATENT DOCUMENTS

2006/0007097 A1 1/2006 Ichikawa

2007/0075217 A1 4/2007 Kuo et al.

FOREIGN PATENT DOCUMENTS

| JP | 11-260568 | 9/1999 |
|---|---|---|
| JP | 2004-021147 | 1/2004 |
| JP | 2004-184852 | 7/2004 |
| JP | 2004-199968 | 7/2004 |
| JP | 2005-070132 | 3/2005 |
| JP | 2005-091526 | 4/2005 |
| JP | 2006-091237 | 4/2006 |
| JP | 2006-267784 | 10/2006 |
| JP | 2006-267785 | 10/2006 |
| JP | 2007-149402 | 6/2007 |
| WO | WO2005/057275 | 6/2005 |

*Primary Examiner*—Seung C Sohn
(74) *Attorney, Agent, or Firm*—Harness, Dickey & Pierce, P.L.C.

(57) ABSTRACT

An illuminating device includes a plurality of light sources, a light guide plate that has plate surfaces on front and rear sides and a plurality of end faces formed around the plate surfaces, receives light emitted from the plurality of light sources through a light incident surface, which is at least one end face among the plurality of end faces, and emits the light through a light-emitting surface, which is one of the plate surfaces, a plurality of photodetectors that are disposed to face the end faces or the plate surfaces of the light guide plate, and a light source control unit that controls light emission of the plurality of light sources on the basis of the output of the plurality of photodetectors. The plurality of photodetectors include at least two photodetectors including light receiving surfaces that face the end faces or the plate surfaces in different directions from each other.

10 Claims, 8 Drawing Sheets

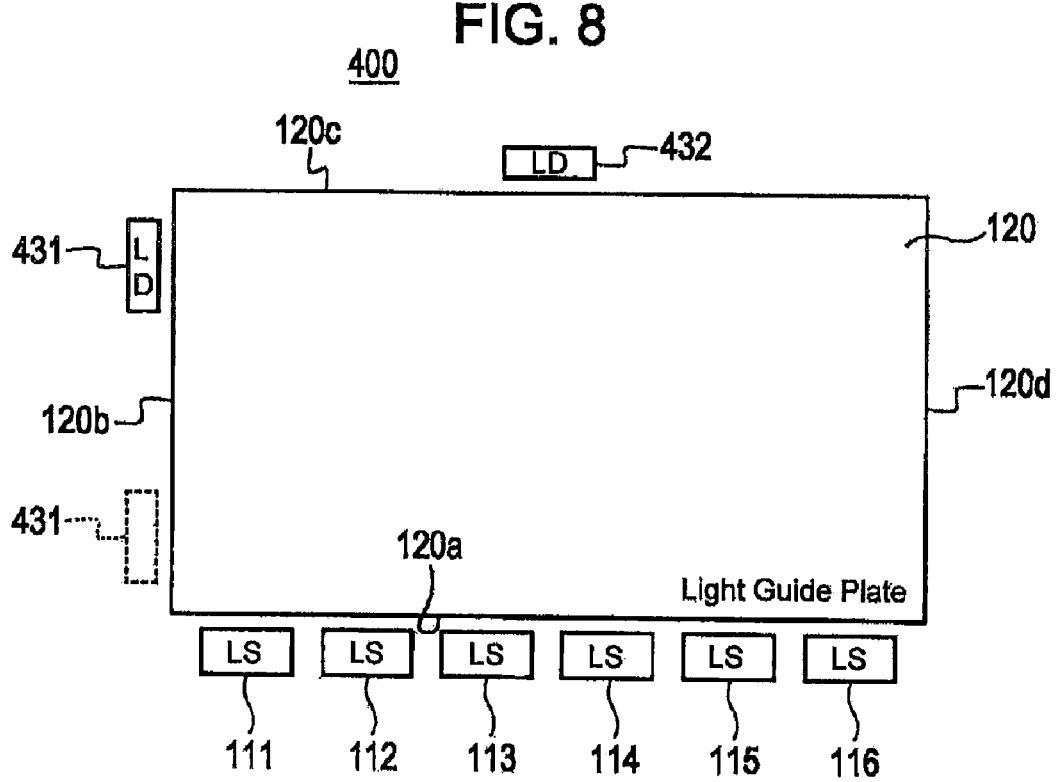
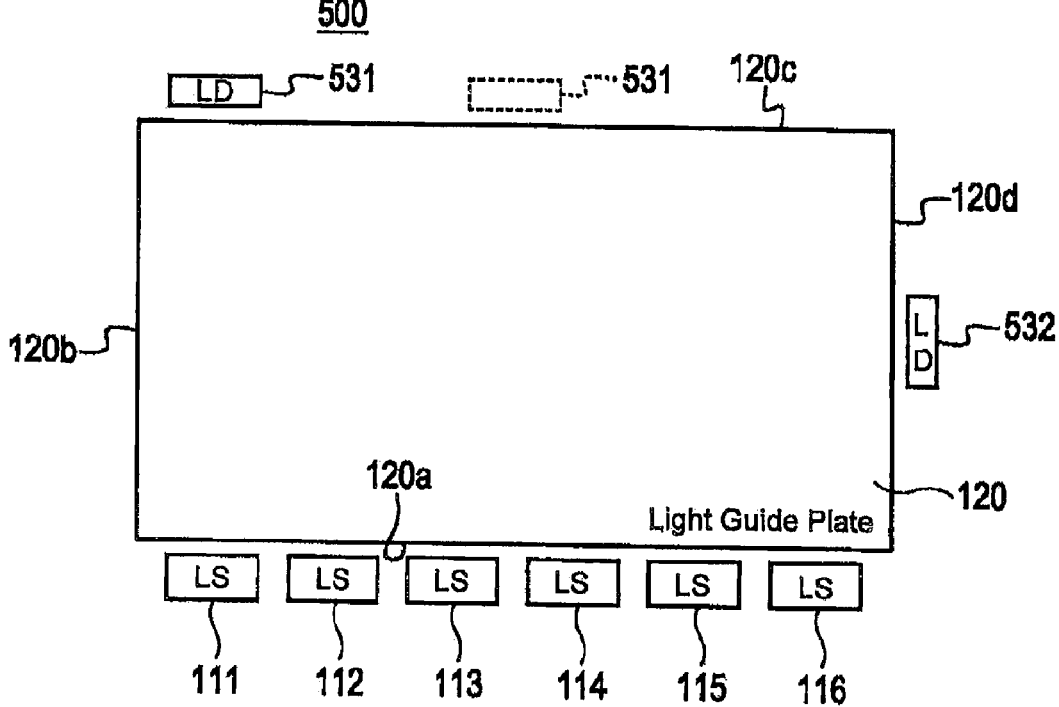

ILLUMINATING DEVICE, ELECTRO-OPTICAL DEVICE, AND ELECTRONIC APPARATUS

CROSS-REFERENCE TO RELATED APPLICATIONS

This application is a divisional patent application of U.S. Ser. No. 11/697,494 filed Apr. 6, 2007, claiming priority to Japanese Patent Application No. 2006-110916, filed Apr. 13, 2006, all of which are incorporated by reference in their entireties.

BACKGROUND

1. Technical Field

The present invention relates to an illuminating device, to an electro-optical device, and to an electronic apparatus. In particular, the invention relates to a structure of an illuminating device having a function of controlling light emission of light sources according to detection values of photodetectors.

2. Related Art

In a known illuminating device, light emitted from light sources, such as LEDs, is made incident on a light guide plate, propagates through the light guide plate, and is emitted from a light-emitting surface of the light guide plate. Such an illuminating device has been used as, for example, a planar illuminating device, such as a backlight, for illuminating a liquid crystal panel.

In the illuminating device, uniformity of luminance of light emitted from a light-emitting surface needs to be ensured, and white balance of the emitted light needs to be ensured. Since light sources have variations in luminance and chromaticity, when a plurality of light sources are disposed, a variation in illumination light may be further increased when the individual light sources having different levels of luminance and chromaticity are combined. Therefore, a method of detecting luminance or color tones using photodetectors, which are arranged around the light guide plate or at a light emitting side, and performing feedback control on the luminance and the color tones of the light source according to the detected values has been proposed (for example, see JP-A-2005-91526, JP-A-2004-199968, and JP-A-2005-70132).

However, in the control method using the detection values of the photodetectors, light, which is emitted from the light guide plate, is detected using the photodetectors, and the light sources are controlled on the basis of the detection. For example, devices disclosed in JP-A-2005-91526 and JP-A-2004-199968 detects only light, which is emitted from the light guide plate in a predetermined direction. Therefore, there is a case in which detection values of the photodetectors may not sufficiently reflect the entirety of the illumination light emitted from the light-emitting surface of the light guide plate. Even when the light sources are controlled on the basis of the detection values, the illumination light is not sufficiently controlled.

Further, in a device disclosed in JP-A-2005-70132, in order to detect light incident on a display cell, a photodetector is correspondingly arranged on one substrate surface of the display cell. Therefore, it may not be possible to form only the illuminating device, and a structure of the display cell or a wiring line installation becomes complex, thereby increasing manufacturing costs.

SUMMARY

An advantage of some aspects of the invention is that it provides an illuminating device which is capable of controlling illumination light with high accuracy by accurately detecting the illumination light of the illuminating device without complicating a structure of one illuminating device or a wiring line installation, and an electro-optical device including the illuminating device.

According to a first aspect of the invention, an illuminating device includes a plurality of light sources, a light guide plate that has plate surfaces on front and rear sides and a plurality of end faces formed around the plate surfaces, receives light emitted from the plurality of light sources through a light incident surface, which is at least one end face among the plurality of end faces, and emits the light through a light-emitting surface, which is one of the plate surfaces, a plurality of photodetectors that are disposed to face the end faces or the plate surfaces of the light guide plate, and a light source control unit that controls light emission of the plurality of light sources on the basis of the output of the plurality of photodetectors. The plurality of photodetectors include at least two photodetectors including light receiving surfaces that face the end faces or the plate surfaces in different directions from each other.

According to this structure, since the plurality of photodetectors include at least two photodetectors that include light receiving surfaces that are disposed to face the end faces or the plate surfaces facing in different directions from each other, it is possible to accurately detect light that is emitted along different directions from the light guide plate. Therefore, by using the detection values, it is possible to perform the control by sufficiently reflecting a state of illumination light emitted from the light emitting surface of the light guide plate.

Preferably, the plurality of photodetectors include at least two photodetectors that have the light receiving surfaces thereof disposed at positions distant from the light receiving surface by different distances. Since the light receiving surfaces are arranged at positions distant from the light receiving surface by different distances, it is possible to detect light that is emitted at different positions as viewed in a propagation direction of the light of the light guide plate. Therefore, it is possible to reduce an effect on the control due to a variation of the illumination light as viewed in the propagation direction, and thus it is possible to perform the control while more accurately reflecting the illumination light.

Preferably, the plurality of photodetectors include at least two photodetectors that have light receiving surfaces thereof that face a central portion and one end portion in an arrangement direction of the plurality of light sources are arranged, or both end portions of the arrangement direction, when viewed from the light incident surface. Therefore, as the light receiving surfaces that are separated from each other along the direction where the plurality of light sources are arranged are formed, it is possible to reduce an effect on the control due to a variation of the arranged direction of the light sources. Accordingly, it is possible to perform the control by more accurately reflecting the illumination light.

Preferably, the light guide plate has a rectangular shape in plan view, and the plurality of photodetectors include at least two adjacent photodetectors that have light receiving surfaces that are disposed to face two of the end faces and the plate surfaces of the light guide plate that are adjacent to each other. Therefore, in the light guide plate having the rectangular shape viewed in plane, the light receiving surfaces disposed to face the two adjacent end faces or the plate surfaces, respectively. Since it is possible to detect light that is emitted toward a direction at 90 degrees from the light guide plate, it is possible to perform the control while more accurately reflecting the illumination light.

Preferably, the light source control unit collectively controls the plurality of light sources on the basis of representative values, which are derived from detection values detected by the plurality of photodetectors. Since the plurality of light sources are collectively controlled on the basis of representative values, which are derived from detection values detected by the plurality of photodetectors, it is possible to achieve simplification of the light source control unit. Therefore, it is possible to achieve a control state in which the illumination light is sufficiently reflected, and reduce manufacturing costs. Here, the representative value may include an average value of a plurality of detection values, a weighted average value, the sum, the linear sum, or a median value. In particular, for the easy deduction, the average value or the sum may be preferably used. Further, since the weight can be arbitrarily set for various situations, the average value and the sum may be preferably used.

Preferably, the light sources control chromaticity of emitted light, the photodetectors output detection values with which chromaticity of detected light can be derived, and the light source control unit controls collectively chromaticity of emitted light of the plurality of light sources on the basis of representative values of chromaticity that are derived from the detection values of the plurality of photodetectors. Therefore, it is possible to easily control the chromaticity of the illumination light, for example, white balance.

Preferably, the light sources control luminance of emitted light, the photodetectors output detection values with which luminance of detected light can be derived, and the light source control unit collectively controls luminance of emitted light of the plurality of light sources on the basis of representative values of luminance that are derived from the detection values of the plurality of photodetectors. Therefore, it is possible to easily control the luminance of the illumination light.

According to a second aspect of the invention, an electro-optical device includes the above-described illuminating device, and an electro-electronic panel that are disposed on a light emitting side of the illuminating device and functions on the basis of illumination light of the illuminating device. Since it is possible to reduce variations in luminance or chromaticity by the illuminating device, it is possible to obtain reproducibility of good display of color tones.

According to a third aspect of the invention, an electronic apparatus includes the electro-optical device. Examples of the electronic apparatus may include various electronic apparatus using electro-optical devices on display units, for example, computer devices, display devices, cellular phones, electronic watches, and projectors.

BRIEF DESCRIPTION OF THE DRAWINGS

The invention will be described with reference to the accompanying drawings, wherein like numbers refer to like elements.

FIG. 3 is an enlarged partial cross-sectional views schematically showing the positional relationship between a light guide plate and photodetectors.

FIG. 8 is a schematic plan view illustrating the planar arrangement of an illuminating device according to a fourth embodiment.

FIG. 9 is a schematic plan view illustrating the planar arrangement of an illuminating device according to a fifth embodiment.

DESCRIPTION OF EXEMPLARY EMBODIMENTS

Hereinafter, an illuminating device, an electro-optical device, and an electronic apparatus according to embodiments of the invention will be described with reference to the accompanying drawings.

First Embodiment

Illuminating Device

Figure 1:
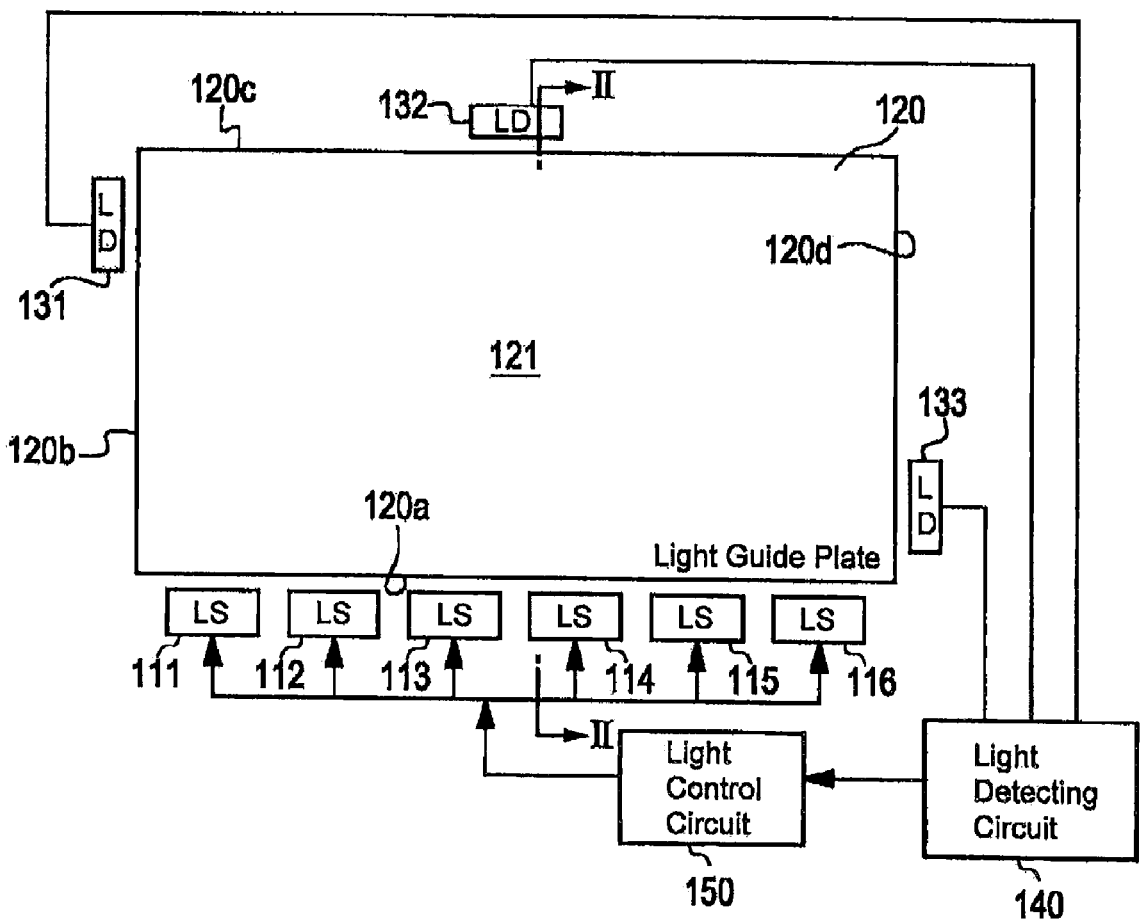
FIG. 1 is a schematic plan view illustrating the planar arrangement of an illuminating device according to a first embodiment of the invention.

FIG. 1 is a schematic view illustrating the structure of an illuminating device according to a first embodiment of the invention. An illuminating device 100 includes a plurality of light sources (in the example of FIG. 1, six light sources) 111, 112, 113, 114, 115, and 116, a light guide plate 120 that receives light emitted from the light sources from a light incident surface 120a, which is one of the end faces thereof, and emits the light from a light-emitting surface 121 that is one of the plate surfaces thereof, a plurality of photodetectors (in the example of FIG. 1, three photodetectors) 131, 132, and 133 that are disposed at different positions around the light guide plate 120, a detecting circuit 140 that calculates a representative value on the basis of detection values that are obtained individually by the photodetectors 131, 132, and 133, and a control circuit 150 that controls the light sources 111 to 116 on the basis of a result obtained by comparing the representative value with a predetermined set value. Here, the detecting circuit 140 and the control circuit 150 form the above-described light source control unit.

The light guide plate 120 may be, for example, a plate-like body that has a rectangular shape in plan view and is formed of acryl or polycarbonate having a bending rate of approximately 1.5, and includes a plurality of end faces 120a, 120b, 120c, and 120d (in the example of FIG. 1, four end faces) and two plate surfaces 121 and 122 at front and rear sides. The light guide plate 120 allows incident light introduced from the light incident surface 120a, which is one of the end faces, to propagate through the light guide plate, and emits the light through the light-emitting surface 121 (top surface), which is one of the plate surfaces. Further, a light deflection unit (not shown), such as a fine uneven structure or a dot printed layer, is formed on the bottom surface 122, which is the other plate surface of the light guide plate 120. In addition, a light reflective sheet 130 is disposed below the bottom surface 122 of the light guide plate 120. The light reflective sheet reflects the light, which propagates through the light guide plate 120 and emitted from the bottom surface 122, makes the light incident on the inside of the light guide plate 120 again, and finally the light is emitted from the light-emitting surface 121.

Here, the plurality of light sources 111 to 116 are arranged in a straight line along the light incident surface 120a of the light guide plate 120 with predetermined gaps therebetween. Each of the light sources includes one set of three light emitting units that emit light of different wavelengths of three colors, i.e., red (R), green (G), and blue (B). Each of the R light emitting unit, the G light emitting unit, and the B light emitting unit adjusts luminance in accordance with the amount of current supplied, and are generally set so that the entire light source emits white light. The light emitting units may include, for example, LEDs (light emitting diodes).

Further, the plurality of photodetectors 131, 132, and 133 include light receiving surfaces, which are provided with a plurality of light receiving units that can detect light intensities in different wavelength ranges. Specifically, each of the photodetectors includes a R light receiving unit having a R filter, a G light receiving unit having a G filter, and a B light receiving unit having a B filter, such that each of the photodetectors detects light intensity of a R light component, a G light component, and a B light component according to characteristics of the respective filters. Each of the light receiving units may include, for example, phototransistors or photodiodes.

Further, the plurality of photodetectors 131, 132, and 133 are disposed facing the end faces 120b, 120c, and 120d, respectively, with the light incident surface 120a of the light guide plate 120 being the only end face of one light guide plate 120 not faced by a photodetector. The plurality of photodetectors 131, 132, and 133 detect light that is emitted through each of the end faces of the light guide plate 120. The plurality of photodetectors 131, 132, and 133 are disposed such that the orientations of the light receiving surfaces with respect to the light guide plate 120 are different from one another. Specifically, the light receiving surfaces face the end faces 120b, 120c, and 120d of the light guide plate 120, which face in different directions. The photodetectors each receive light from different directions.

More specifically, as shown in FIG. 1, the photodetector 131 is disposed to face a portion of the end face 120b that is one (left side) end face crossing (orthogonal to) the light incident surface 120a of the light guide plate 120, the portion being disposed far from the light incident surface 120a, that is, an end portion that is adjacent to the end face 120c facing the light incident surface 120a. Further, the photodetector 132 is disposed to substantially face a central portion of the end face 120c that faces the light incident surface 120a of the light guide plate 120. Further, the photodetector 133 is disposed to face a portion of the end face 120d that is the other (right side) end face crossing (orthogonal to) the light incident surface 120a, the portion that is disposed close to the light incident surface 120a, that is, an end portion being disposed close to the light incident surface 120a.

Accordingly, the photodetector 131 measures light that is emitted toward one side direction from the end portion of the end face 120b, which is disposed far from the light incident surface 120a. Further, the photodetector 132 measures light emitted from the substantially central portion of the end face 120c in almost the same direction as a propagation direction of light. Furthermore, the photodetector 133 measures light that is emitted from the end portion of the end face 120d, which is disposed close to the light incident surface 120a, in the other side direction.

Figure 3A:
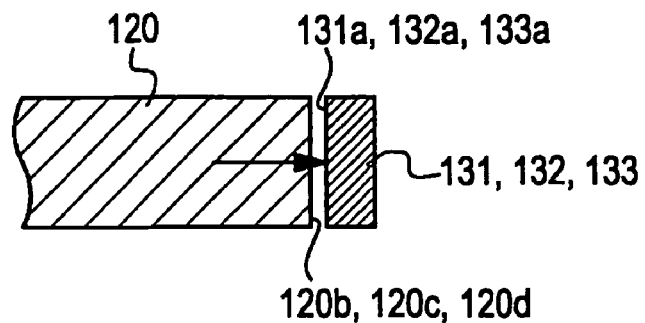
FIGS. 3A, 3B, 3C, and 3D are
Figure 3B:
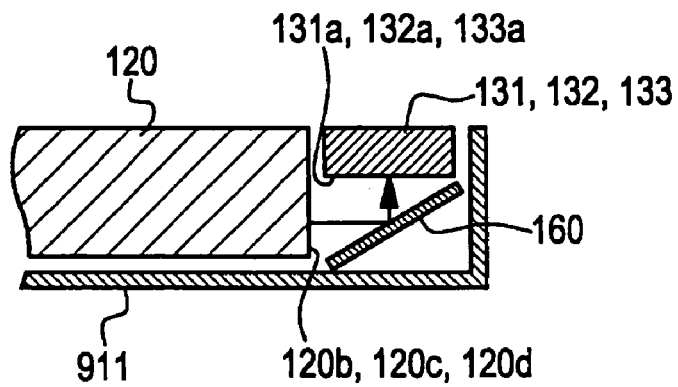

Further, the photodetectors 131, 132, and 133 may be positioned, for example, as shown in FIG. 3A, so that the light receiving surfaces 131a, 132a, and 133a face the end faces 120b, 120c, and 120d of the light guide plate 120, respectively. Alternatively, the photodetectors may be positioned as follows. As shown in FIG. 3B, the light receiving surfaces 131a, 132a, and 133a do not directly face the end faces 120b, 120c, and 120d, but light emitted from the end faces 120b, 120c, and 120d is made incident on the light receiving surface through a light guiding member (reflector in the drawing) 160.

In the example shown in the drawing, the photodetectors 131, 132, and 133 are disposed to face the end faces 120b, 120c, and 120d of the light guiding plate 120, respectively. Alternatively, the photodetectors 131, 132, and 133 may be disposed to face portions of the light-emitting surface 121 or the bottom surface 122. In theses cases, in order not to interfere with an illumination range of the illuminating device 100, the photodetectors 131, 132, and 133 may be disposed to face an outer circumferential portion (a portion separated from a driving area of an electro-optical panel to be described below) of the light-emitting surface 121 or the bottom surface 122.

Figure 3C:
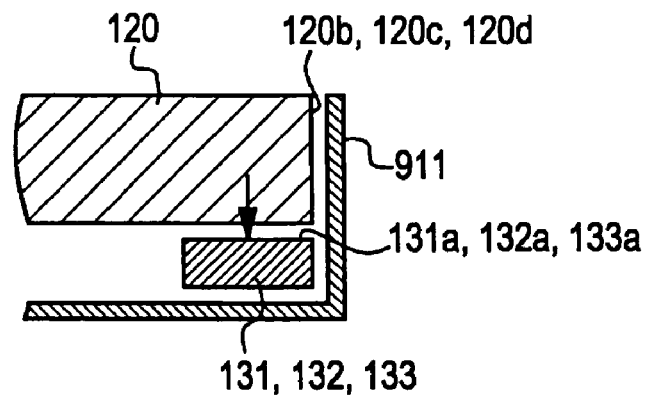

For example, as shown in FIG. 3C, the photodetectors 131, 132, and 133 may be disposed to face the bottom surface 122 of the light guide plate 120. At this time, the photodetectors face upward such that the light receiving surfaces 131a, 132a, and 133a thereof face the bottom surface 122. Further, it is preferable that the photodetectors 131, 132, and 133 be disposed between the light guide plate 120, and a frame body 911 that accommodates the light guide plate 120. In contrast, the photodetectors may be disposed above the light-emitting surface 121 with the light receiving surfaces thereof facing downward.

Figure 3D:
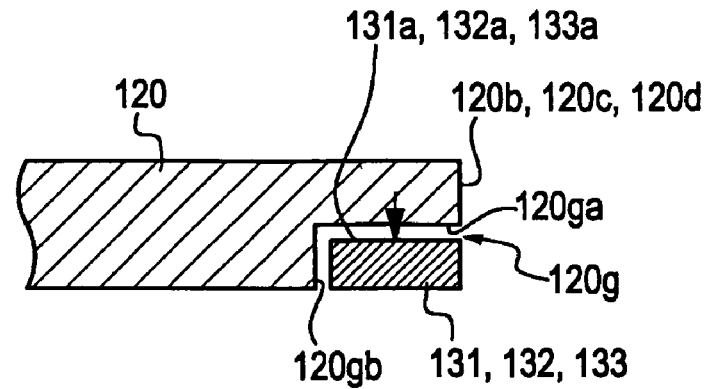

Further, as shown in FIG. 3D, a notch 120g is formed in a bottom portion of the end face of the light guide plate 120, and each of the photodetectors 131, 132, and 133 is accommodated in the notch 120g. Therefore, as compared with the case in FIG. 3C, the thickness of the illuminating device can be reduced. At this time, each of the light receiving surfaces 131a, 132a, and 133a of the photodetectors faces an internal surface 120ga of the notch 120g. Further, since each of the light receiving surfaces is disposed to face the internal surface 120ga, it is possible to form the illuminating device having a smaller size as compared with the case in FIG. 3A.

The detecting circuit 140 shown in FIG. 1 calculates a representative value of the respective detection values that are output by the plurality of photodetectors 131, 132, and 133, and outputs the calculated representative value to the control circuit 150. In general, the representative value may be, for example, an average value. However, the representative value may a median value, a weighted average value set in accordance with an appropriate weight coefficient, a simple sum, or a linear sum set in accordance with an appropriate coefficient. Further, the detecting circuit 140 outputs a representative value of chromaticity on the basis of the detection values detected by each of the photodetectors. Alternatively, as described below, the detecting circuit 140 may obtain a representative value of luminance on the basis of each of the detection values detected by the photodetectors, or obtain representative values of both the chromaticity and the luminance. Hereinafter, the description will be made on the assumption that an average value of the chromaticity is calculated by the detecting circuit 140 and the control circuit 150 controls chromaticity of each of the light sources.

In this case, for the calculation of the average value of the detection values, chromaticity C1 is calculated of the basis of intensities L1$r$, L1$g$, and L1$b$ of RGB components of light that is detected by the photodetector 131. The chromaticity C1 can be a value calculated by using an appropriate color system. For example, since in a CIE color system that is used in a chromaticity diagram shown in FIG. 4, chromaticity is expressed according to x and y, the chromaticity is calculated, for example, in the form of C1 (x1 and y1). In the same manner, chromaticity C2 (x2 and y2) is calculated on the basis of detection values of the photodetector 132, and chromaticity C3 (x3 and y3) is calculated on the basis of detection values of the photodetectors 133. Then, an average value P (xp and yp) of three chromaticities C1, C2, and C3 is obtained. Here, the equations used are as follows: xp=(x1+x2+x3)/3 and yp=(y1+y2+y3)/3.

The control circuit 150 compares the average value P (xp and yp), which is output by the detecting circuit 140 as described above, with a previously set value A (xa and ya) that expresses predetermined chromaticity so as to calculate chromaticity difference ΔC (Δx and Δy). Here, the equations used are as follows: Δx=xp−xa and Δy=yp−ya. In addition, on the basis of the chromaticity difference ΔC, control signals SR, SG, and SB are output by the control circuit 150. Here, the control signals SR, SG, and SB are commonly transmitted to the light sources 111 to 116. That is, in the light sources 111 to 116, the R light emitting unit (formed of the red LED and the like) that emits light in a red range is controlled by the control signal SR, the G light emitting unit (formed of the green LED and the like) that emits light in a green range is controlled by the control signal SG, and the B light emitting unit (formed of the blue LED and the like) that emits light in a blue range is controlled by the control signal SB. The control signals SR, SG and SB define values of currents that are supplied to the light emitting units, and the like, and adjust light emitted from the light sources 111 to 116 so as to reduce the chromaticity difference ΔC.

Figure 4:
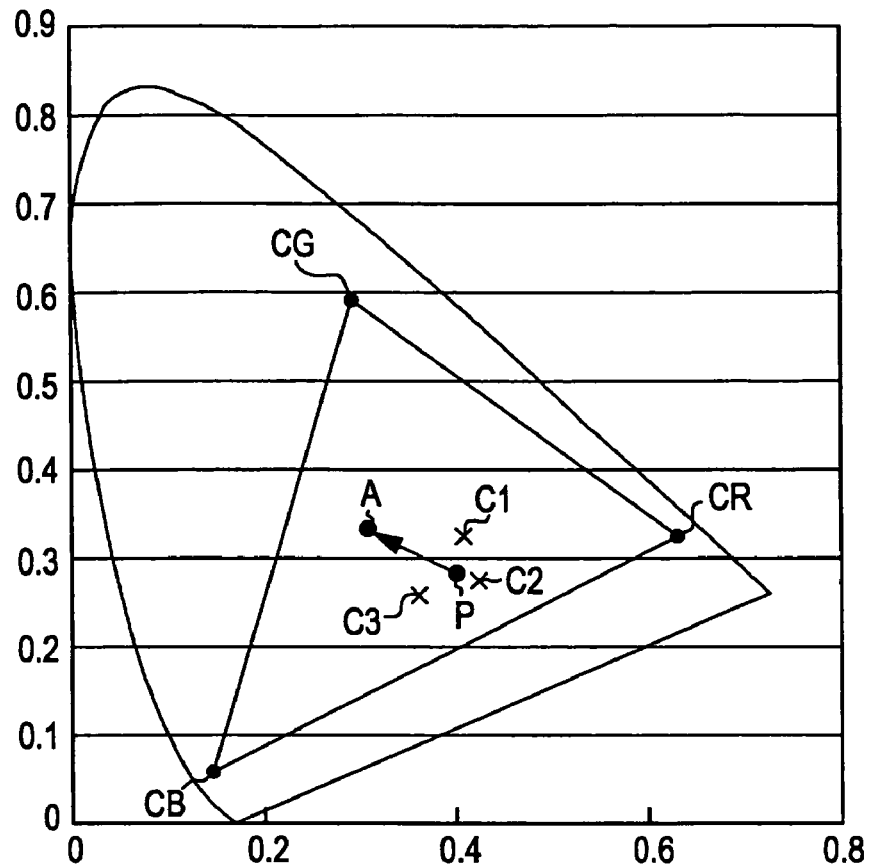
FIG. 4 is a chromaticity diagram illustrating a control method.

For example, as shown in FIG. 4, when an emission color of the R light emitting unit of each of the light sources 111 to 116 is CR, an emission color of the G light emitting unit thereof is CG, and an emission color of the B light emitting unit thereof is CB, and the light sources 111 to 116 can reproduce colors in a triangle of CR-CG-CB. As light intensity of each of the emission colors CR, CG, and CB is changed on the basis of the difference ΔC between the average value P and the previously set value A, in order to reduce the difference ΔC, that is, in order to approximate the average value P to the previously set value A, the control signals SR, SG, and SB are generated.

The light source control unit may be constructed so as to control the light sources according to a different method from the above-described method. For example, for the average value of the chromaticity, when intensities of RGB components of light, which are detected by the photodetector 131, are L1$r$, L1$g$, and L1$b$, intensities of RGB components of light, which are detected by the photodetector 132, are L2$r$, L2$g$, and L2$b$, and intensities of RGB components of light, which are detected by the photodetector 133, are L3$r$, L3$g$, and L3$b$, average intensity Pr of the R components of the three photodetectors 131, 132, and 133, average intensity Pg of the G components thereof, and average intensity Pb of the B components thereof can be used. Here, the equations used are as follows: Pr=(L1$r$+L2$r$+L3$r$)/3, Pg=(L1$g$+L2$g$+L3$g$)/3, and Pb=(L1$b$+L2$b$+L3$b$)/3.

Figure 5:
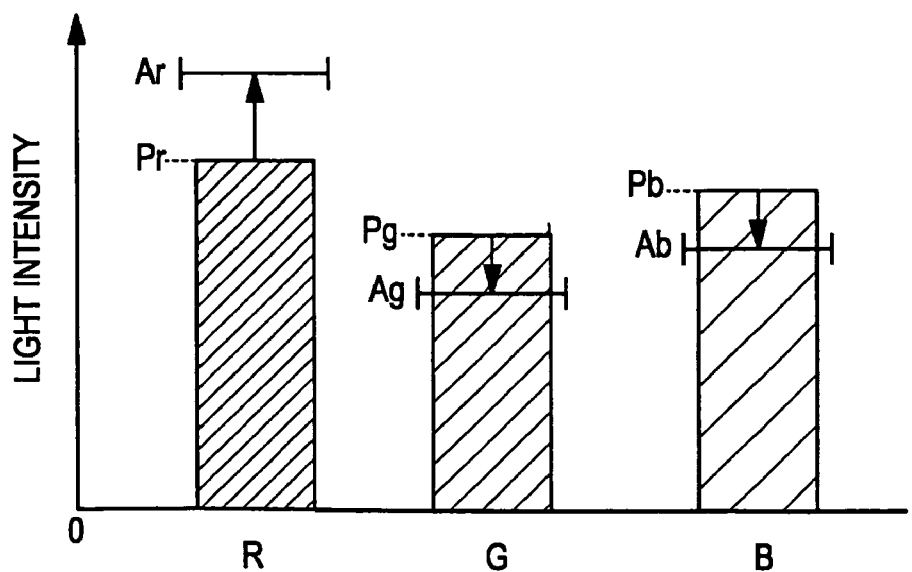
FIG. 5 is a graph showing average intensities of RGB components of detected light and previously set values corresponding to the average intensities.

FIG. 5 shows the average values Pr, Pg, and Pb of the light intensities of the RGB components. Then, the average values Pr, Pg, and Pb are compared with previously set values Ar, Ag, and Ab corresponding to the light components, respectively, and differences ΔIr=Pr−Ar, ΔIg=Pg−Ag, and ΔIb=Pb−Ab of the light intensities of the respective components are obtained. Further, the control signals SR, SG, and SB corresponding to the R light emitting unit, the G light emitting unit, and the B light emitting unit are decreased or increased according to the differences, and output to the light sources 111 to 116, thereby setting the chromaticity of the emitted light of each of the light sources. Even in this way, it is possible to control the light sources such that the difference between the average value P and the previously set value A is reduced.

As described above, even when either method is used, according to this embodiment, chromaticity (white balance) of illumination light that is emitted from the light-emitting surface 121 of the light guide plate 120 can be feedback-controlled. In this case, it is preferable that the plurality of light sources 111 to 116 be collectively controlled by the common control signals, because the control circuit 150 can be simply and easily formed. Even in this way, since an object of the chromaticity control according to this embodiment is reproducibility of the chromaticity of the entirety of the illumination light that is emitted from the light-emitting surface 121 of the light guide plate 120, sufficient control effect with respect to a variation in chromaticity level of the entirety of the illumination light can be obtained by the combination of the characteristics of the plurality of light sources 111 to 116.

Further, the above-described light source control unit may only perform the above-described control when a starting switch (not shown) is operated or a predetermined starting signal is input. Further, in general, the control may be performed with a predetermined period or timing.

Further, in the above description, the chromaticity is controlled. However, when luminance is controlled, the representative value of luminance from the detection values of the plurality of photodetectors in the detecting circuit 140, for example, the average value is calculated, and according to a result obtained by comparing the representative value of the luminance with the previously set value of luminance, it is possible to control the plurality of light sources. In this case, the luminance is preferably adjusted such that the luminance itself is not changed. However, as described above, the chromaticity may be controlled and at the same time, the luminance may also be controlled. In this way, both the chromaticity and the luminance of the illumination light can be made to approximate the previously set values.

In particular, the representative value of the luminance is not affected by a variation in a left end portion and a right end portion, or a central portion and both end portions of one of the plurality of end faces of the light guide plate 120 as viewed in a direction in which the light sources are arranged, or a variation in a portion adjacent to the light incident surface 120$a$ of the light guide plate 120 and a portion distant from the light incident surface 120$a$ of the light guide plate 120 as viewed in a propagation direction of light in the light guide plate 120. Therefore, an average is effectively obtained by applying a predetermined weight to the detection value of each of the photodetectors or linear sum is effectively obtained by applying a weight to the detection value with a predetermined coefficient.

According to the first embodiment of the invention, since the plurality of photodetectors 131, 132, and 133 are disposed to face the three end faces 120b, 120c, and 120d of the light guide plate 120 that face different in directions from each other, light emitted from the light guide plate 120 in different directions can be detected through the plurality of photodetectors 131, 132, and 133. Therefore, light can be detected while more accurately reflecting the entirety of the illumination light emitted from the light-emitting surface 121 of the light guide plate 120. Accordingly, it is possible to perform the chromaticity control with high accuracy.

In particular, the plurality of photodetectors are disposed to face the different end faces of the light guide plate 120. Also, the plurality of photodetectors are disposed to face portions disposed far from the light incident surfaces of the end faces 120b, 120c, and 120d, the center portions thereof, and the portions disposed close thereto. It is possible to perform control in a state where the entirety of the illumination light is accurately reflected.

Electro-Optical Device

Figure 2:
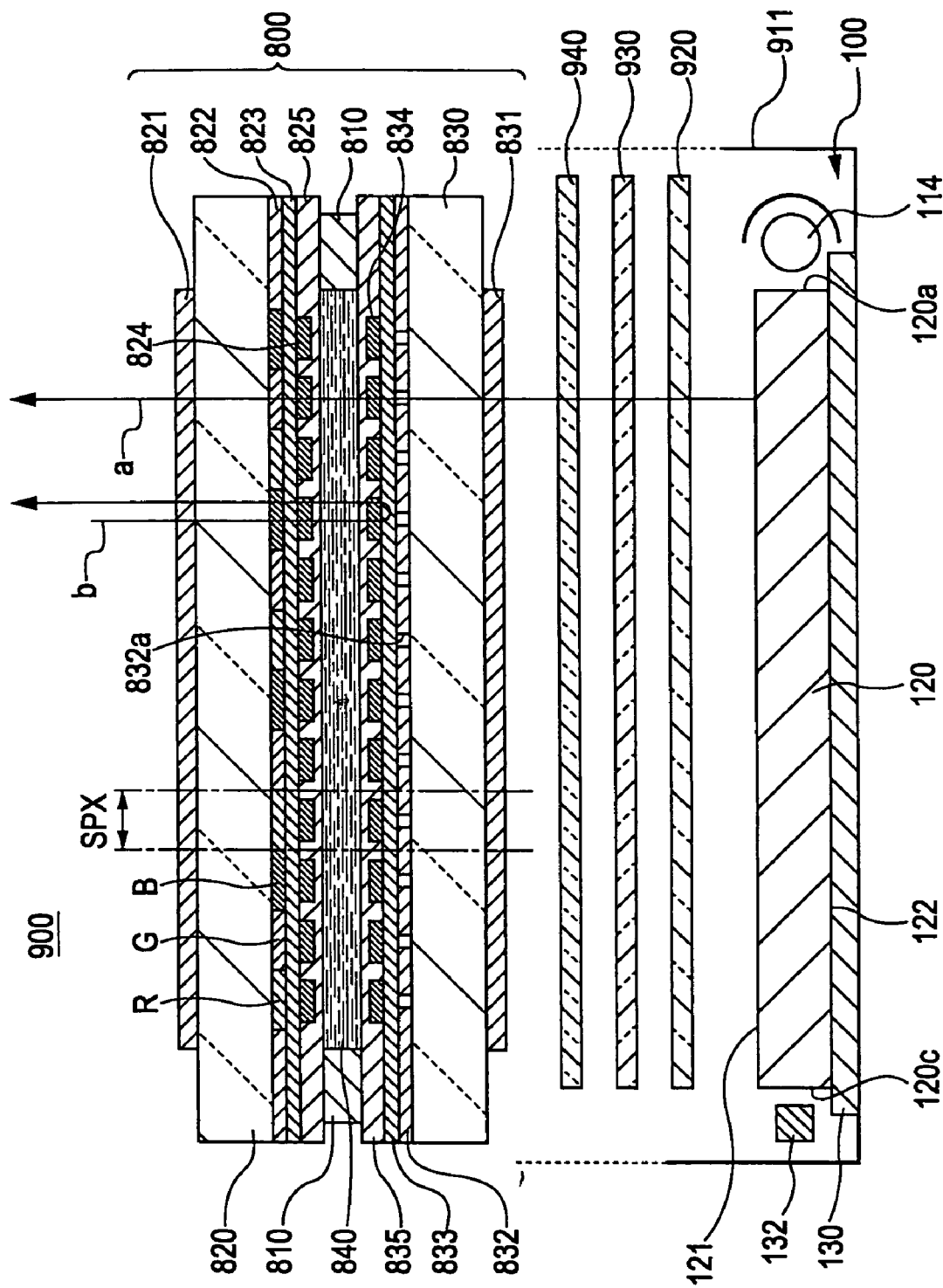
FIG. 2 is a schematic longitudinal cross-sectional view taken along the line II-II of FIG. 1 of an electro-optical device to which the illuminating device according to the first embodiment is applied as a backlight.

FIG. 2 is a schematic longitudinal cross-sectional view taken along the line II-II of FIG. 1, illustrating an electro-optical device 900 that includes the illuminating device 100. The electro-optical device 900 uses the illuminating device 100 as a backlight. On the light-emitting surface 121 of the illuminating device 100, a light diffusing sheet 920, and two prism sheets 930 and 940 are disposed, and an electro-optical panel 800 is disposed thereon.

The light diffusing sheet 920 equalizes light that is radiated on at least a driving area of the electro-optical panel 800, and is a semi-transparent sheet that scatters or diffuses light. The light diffusing sheet 920 is obtained, for example, by applying resin mixed with transparent beads to a sheet formed of transparent synthetic resin, such as polyester.

The two prism sheets 930 and 940 collect light of the illuminating device 100 so as to increase front luminance of a viewing side. For example, each of the two prism sheets 930 and 940 is obtained by disposing prism structures, each of which extends in a predetermined direction and has a triangular cross-section, in a plurality of stripes. The two prism sheets 930 and 940 are disposed with light collecting directions thereof (directions perpendicular to the extension direction of the prism structures) orthogonal to each other.

The electro-optical panel 800 is formed of a transmissive type or semi-transmissive type liquid crystal display body, and can use various liquid crystal modes, such as TN (Twisted Nematic) liquid crystal and STN (Super Twisted Nematic) liquid crystal. Further, the electrode-optical panel 800 may include an active matrix type display body that uses TFTs (Thin Film Transistors), TFDs (Thin Film Diodes), or the like, as switching elements, or a passive matrix type display body. Further, in the example in the drawings and the description below, it is assumed that the electro-optical panel 800 is formed of a transflective type.

In a case of the example in FIG. 2, the electro-optical panel 800 is formed by sealing liquid crystal 840 between a pair of substrates 820 and 830 that are formed of glass or plastic and bonded to each other with a sealant 810. A polarizer 821 is attached to an external surface of the substrate 820 of the viewing side. Further, color filters 822 having three colors of R, G, and B and a black matrix, a passivation layer 823, pixel electrodes 824, and an alignment layer 825 are sequentially deposited over an internal surface of the substrate 820. Meanwhile, a polarizer 831 is attached to an external surface of the substrate 830 at the backlight side. Further, a light reflecting layer 832 having openings 832a therein, an insulating layer 833, pixel electrodes 834, and an alignment layer 835 are sequentially deposited over an internal surface of the substrate 830.

In the electro-optical panel 800, when a voltage is applied to the pixel electrodes 824 and 834 formed on the pair of substrates 820 and 830, respectively, an alignment state of the liquid crystal 840 is controlled. Since a degree of modulation with respect to a polarized state of illumination light a from the illuminating device 100 or external light b incident from the viewing side is changed, transmittance or reflectance of light in every sub-pixel SPX is controlled by the operation of the polarizers 821 and 831.

In the electro-optical device 900, since the illuminating device 100 is used as the backlight, transmissive display with high reproducibility is achieved by the illumination light a whose chromaticity is controlled as described above.

Second Embodiment

Figure 6:
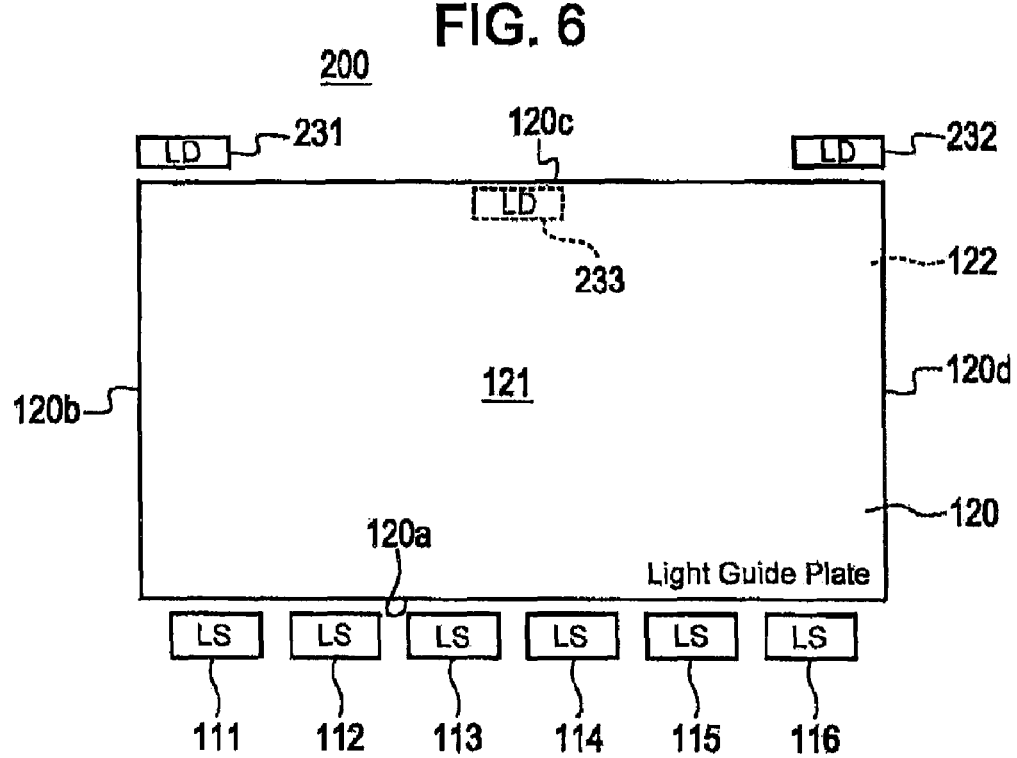
FIG. 6 is a schematic plan view illustrating the planar arrangement of an illuminating device according to a second embodiment.

Next, an illuminating device 200 according to a second embodiment will be described in detail with reference to FIG. 6. FIG. 6 is a schematic plan view illustrating a planar arrangement of light sources, a light guide plate, and photodetectors of the illuminating device 200 according to a second embodiment. In this embodiment, the same constituent elements as those of the illuminating device 100 according to the first embodiment are denoted by the same reference numerals. Thus, the description thereof will be omitted.

This embodiment includes a plurality of photodetectors 231, 232, and 233 having the same structures as the photodetectors 131, 132, and 133 of the illuminating device 100 according to the first embodiment. However, the photodetectors 231 and 232 are disposed to face both end portions of left and right of an end face 120c of the light guide plate 120. Further, the photodetector 233 is disposed to face a bottom surface of the light guide plate 120. More specifically, a light receiving surface of the photodetector 233 is disposed to face a bottom surface portion adjacent to a central portion of the end face 120c of the light guide plate 120.

The illuminating device 200 according to the second embodiment can detect light, which is emitted toward a light propagation direction (upper direction in FIG. 6) from both end portions of the end face 120c of the light guide plate 120, by the two photodetectors 231 and 232, respectively. Further, the illuminating device 200 can detect light, which is emitted downward from the bottom surface of the light guide plate 120, by the photodetector 233.

In this embodiment, light receiving surfaces of the plurality of photodetectors 231 and 232 and the light receiving surface of the photodetector 233 face directions different from each other, and thus, it is possible to detect light emitted toward different directions from the light guide plate 120. Therefore, in the same manner as the first embodiment, it is possible to control the light sources 111 to 116 while sufficiently reflecting the illumination light. Further, in this embodiment, since light of both end portions along a direction in which the light sources 111 to 116 are arranged at the light guide plate 120 can be detected by the photodetectors 231 and 232, it is possible to control the illumination light by adding distribution of the illumination light along the direction in which the light sources 111 to 116 are arranged. Further, since the light receiving surface of the photodetector 233 is disposed to face the bottom surface portion adjacent to the central portion of the end face 120c, even when the bias of the illumination light exists between the central portion and the both end portions as viewed in the direction in which the light sources are arranged, by taking into consideration detection values of the photodetectors 231 and 232, which detect the both end portions, a detection value of the photodetector 233, which detects the central portion, it is possible to control the illumination light by removing the effect due to the bias of the central portion and the both end portions along the direction in which the light sources are arranged.

Further, contrary to this, the photodetectors 231 and 232 may be disposed to face the bottom surface portion adjacent to the both end portions of the end face 120c, and the photodetector 233 may be disposed to face the central portion of the end face 120c. Further, the photodetectors disposed to face the bottom surface portion may be disposed to face the light-emitting surface 121.

Third Embodiment

Figure 7:
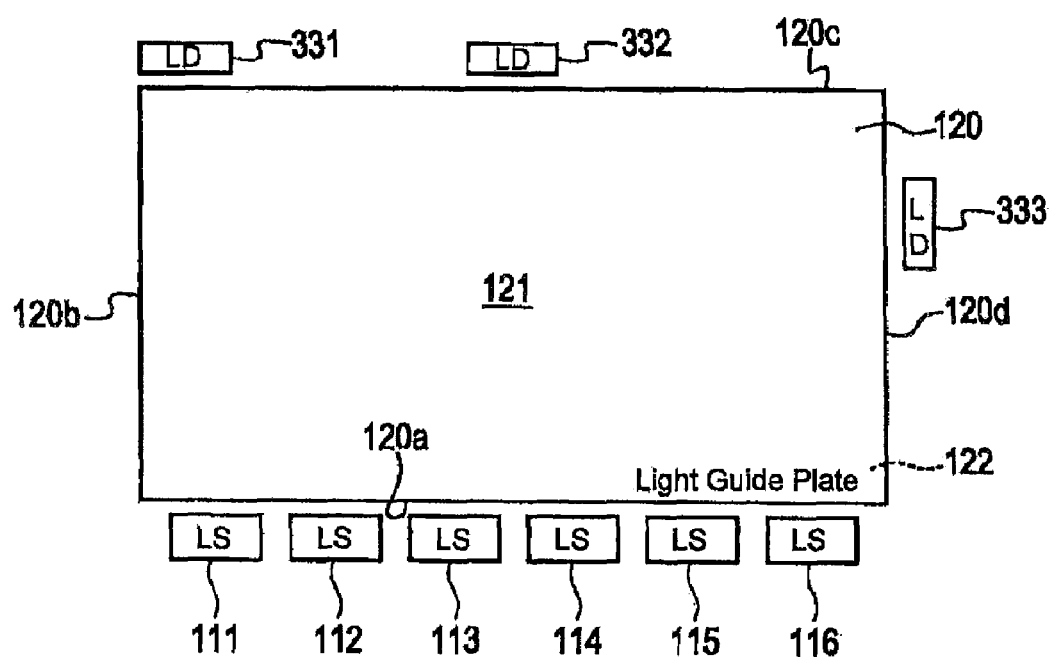
FIG. 7 is a schematic plan view illustrating the planar arrangement of an illuminating device according to a third embodiment.

Next, an illuminating device 300 according to a third embodiment will be described with reference to FIG. 7. FIG. 7 is a schematic plan view illustrating a planar arrangement of light sources, a light guide plate, and photodetectors of the illuminating device according to the third embodiment. Further, the same constituent elements as those of the illuminating device 100 according to the first embodiment are denoted by the same reference numerals. Thus, the description thereof will be omitted.

In this embodiment, a photodetector 331 is disposed to face one end portion of an end face 120c, and a photodetector 332 is disposed to face a central portion of the end face 120c. Further, a photodetector 333 is disposed to face an end face 120d that is adjacent to an end portion opposite to the one end portion of the end face 120c which the photodetector 331 faces.

In this embodiment, by the photodetectors 331 and 332 that face the end portion and the central portion, respectively, of the end face 120c, it is possible to reduce an effect on the control due to a variation of the central portion and the end portion along a direction in which light sources 111 to 116 are arranged. Further, by adding the photodetector 333 facing the end face 120d, it is possible to reduce an effect on the control due to a variation along a direction in which light is emitted, or a variation between both end portions along the direction in which the light sources are arranged. In particular, when the plurality of light sources are arranged, due to the heat radiated from each light source, temperature of the light sources around the center relatively increases, and temperature of the light sources at the end is relatively decreases. Therefore, a state in which the light sources emit light may be changed, and thus, the variation of the illumination light, when viewed in the direction of the light sources arranged, is likely to increase. Accordingly, the above-described disposition of the photodetectors is effective.

Meanwhile, the photodetector 333 may be disposed to face the central portion of the end face 120d or any one of end portions (end portion at the light incident surface 120a or the end face 120c) of the end face 120d.

Fourth Embodiment

Next, an illuminating device 400 according to a fourth embodiment will be described with reference to FIG. 8. FIG. 8 is a schematic plan view illustrating a planar arrangement of light sources, a light guide plate, and photodetectors of an illuminating device according to a fourth embodiment. Here, the same constituent elements as those of the illuminating device 100 according to the first embodiment are denoted by the same reference numerals. Thus, the description thereof will be omitted.

In this embodiment, a photodetector 431 is disposed to face an end portion (in the example in FIG. 8, side that is most spaced from light sources) of an end face 120b of a light guide plate 120, and a photodetector 432 is disposed to face a central portion of an end face 120c of the light guide plate 120.

In this way, by only the two photodetectors 431 and 432, it is possible to reduce an effect on the control due to a variation of light that is emitted toward a different direction from the light guide plate 120, and it is also possible to reduce an effect on the control due to a variation of light of a central portion and end portions when viewed in a direction where light sources are arranged.

Meanwhile, as indicated by dotted line in FIG. 8, the photodetector 431 may be disposed to face an end portion of an end face 120b that is disposed close to the light sources. In this case, it is also possible to reduce an effect on the control due to a variation in a propagation direction of light of the light guide plate 120 by the photodetectors 431 and 432. Further, in the disposition of each of the components, the photodetector 431 may be disposed to face the end face 120d instead of the end face 120b.

Fifth Embodiment

Next, an illuminating device according to a fifth embodiment will be described with reference to FIG. 9. FIG. 9 is a schematic plan view illustrating a planar arrangement of light sources, a light guide plate, and photodetectors of an illuminating device according to a fifth embodiment. Here, the same constituent elements as those of the illuminating device 100 according to the first embodiment are denoted by the same reference numerals. Thus, the description thereof will be omitted.

In this embodiment, a photodetector 531 is disposed to face one end portion of an end face 120c of a light guide plate 120, and a photodetector 532 is disposed to face a central portion of an end face 120d that is adjacent (orthogonal) to an end face 120c that is opposite to an end portion where the photodetector 531 is disposed.

In this way, by only the two photodetectors 531 and 532, it is possible to detect emitted light at different angles and reduce an effect on the control due to a variation of left and right both sides when viewed in a direction where the light sources are arranged. It is also possible to reduce an effect on the control due to a variation between a central portion and end portions when viewed in a propagation direction of light of the light guide plate 120.

Meanwhile, as indicated by dotted line in FIG. 9, the photodetector 531 may be disposed to face the central portion of the end face 120c. In this case, it is possible to stably detect light that is emitted in directions perpendicular to each other from central portions of the end faces 120c and 120d, respectively, of the light guide plate 120 by the photodetectors 531 and 532.

Sixth Embodiment

Figure 10A:
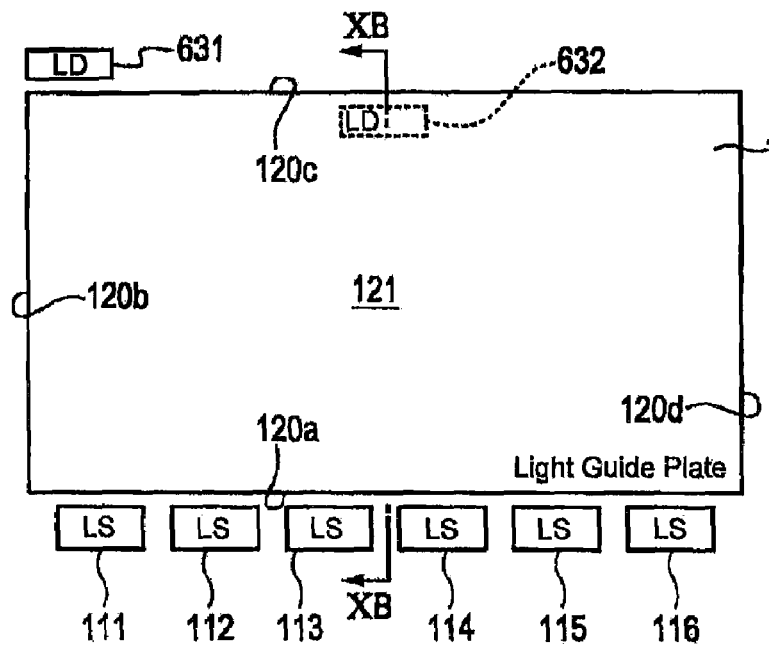
FIG. 10A is a schematic plan view illustrating the planar arrangement of an illuminating device according to a sixth embodiment.
Figure 10B:
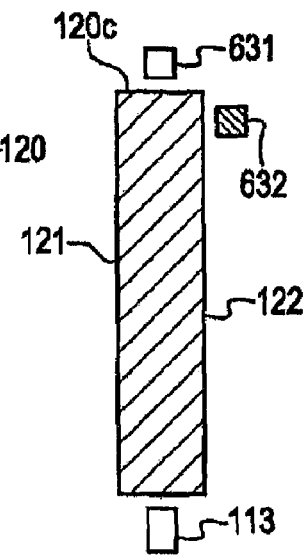
FIG. 10B is a schematic longitudinal cross-sectional view taken along the line XB1-XB1 of FIG. 10A.

Next, an illuminating device according to a sixth embodiment will be described with reference to FIGS. 10A and 10B. FIG. 10A is a schematic plan view illustrating a planar arrangement of light sources, a light guide plate, and photodetectors of an illuminating device according to a sixth embodiment. FIG. 10B is a schematic longitudinal cross-sectional view taken along the line XB1-XB1 of FIG. 10A.

Here, the same constituent elements as those of the illuminating device 100 according to the first embodiment are denoted by the same reference numerals. Thus, the description thereof will be omitted.

In this embodiment, one photodetector 631 is disposed to face an end portion of an end face 120c, and the other photodetector 632 is disposed to face a central portion of a bottom surface 122 of a light guide plate 120, that is, a bottom surface portion that is adjacent to a central portion of an end face 120c.

In this way, by only the two photodetectors 631 and 632, it is possible to detect light that is emitted toward different directions from the light guide plate 120, and it is also possible to reduce an effect on the control due to a variation of the central portion and the end portion when viewed in a direction where the light sources are arranged.

Meanwhile, the photodetector 631 may be disposed at an end portion of the end face 120c toward an end face 120d. Further, contrary to the above description, the photodetector 631 may be disposed to face a bottom surface portion that is adjacent to the end portion of the end face 120c, and the photodetector 632 may be disposed to face the central portion of the end face 120c. Further, the photodetector disposed to face the bottom surface portion may be disposed to face the light-emitting surface 121, not the bottom surface 122.

Seventh Embodiment

Figure 11A:
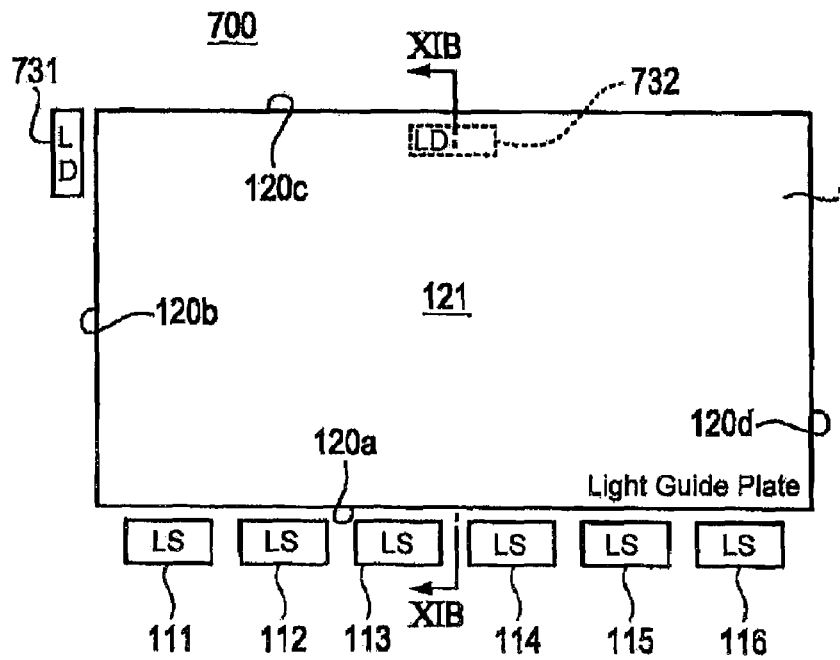
FIG. 11A is a schematic plan view illustrating the planar arrangement of an illuminating device according to a seventh embodiment.
Figure 11B:
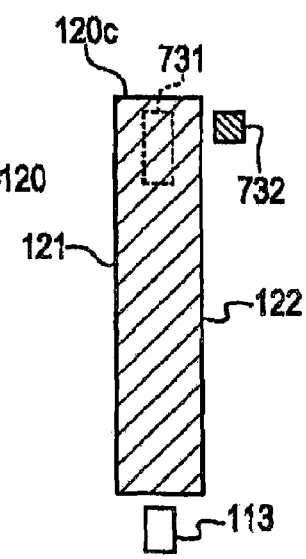
FIG. 11B is a schematic longitudinal cross-sectional view taken along the line XIB1-XIB1 of FIG. 11A.

Next, an illuminating device according to a seventh embodiment will be described with reference to FIGS. 11A and 11B. FIG. 11A is a schematic plan view illustrating a planar arrangement of light sources, a light guide plate, and photodetectors of an illuminating device according to a seventh embodiment. FIG. 11B is a schematic longitudinal cross-sectional view taken along the line XIB2-XIB2 of FIG. 11A. Here, the same constituent elements as those of the illuminating device 100 according to the first embodiment are denoted by the same reference numerals. Thus, the description thereof will be omitted.

In this embodiment, one photodetector 731 is disposed to face an end face 120b, and the other photodetector 732 is disposed to face a bottom surface 122 of a light guide plate 120. Specifically, the photodetector 731 is disposed to face an end portion of an end face 120b toward an end face 120c, and the photodetector 732 is disposed to face a bottom surface portion that is adjacent to a central portion of the end face 120c.

In this way, by the two photodetectors 731 and 732, it is possible to reduce an effect on the control due to a variation of light that is emitted toward different directions from a light guide plate 120, and it is also possible to reduce an effect on the control due to a variation of the central portion and the end portion when viewed in a direction where the light sources are arranged.

Meanwhile, the photodetector 731 may be disposed to face an end face 120d. In contrast, the photodetector 731 may be disposed to face the bottom surface portion that is adjacent to the end portion of the end face 120b, and the photodetector 732 may be disposed to face the central portion of the end face 120c of the light guide plate 120. Further, the photodetector that is disposed to face the bottom surface portion may be disposed to face the light-emitting surface 121, not the bottom surface 122.

Electronic Apparatus

Figure 12:
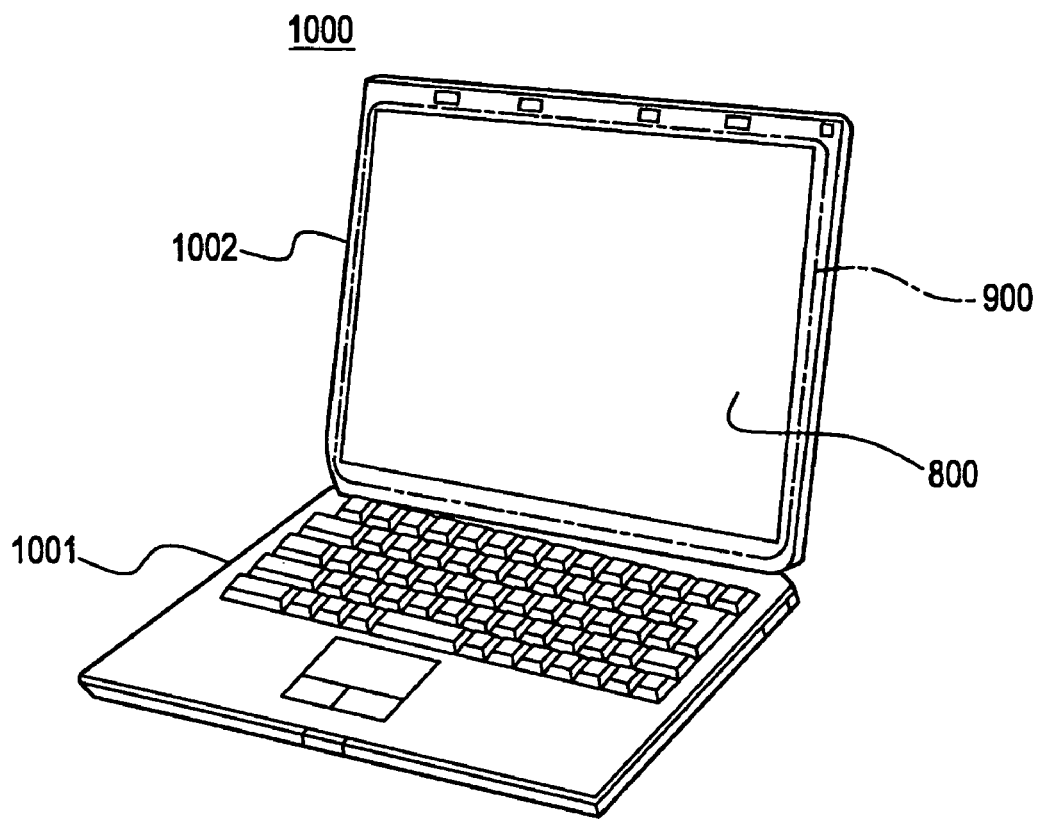
FIG. 12 is a schematic perspective view illustrating the appearance of a notebook computer according to an embodiment of an electronic apparatus.

Finally, an electronic apparatus mounted with the electro-optical device including the illuminating device will be described in detail. FIG. 12 is a view illustrating the appearance of a notebook computer according to an embodiment of an electronic apparatus. This notebook computer 1000 includes an operation unit 1001 and a display unit 1002, and an electro-optical device 900 including an illuminating device 100 is disposed in the display unit 1002. Here, the illuminating device 100 is used as a backlight of an electro-optical panel 800, and a display screen of the electro-optical panel 800 can be visibly recognized on the surface of the display unit 1002.

Figure 13:
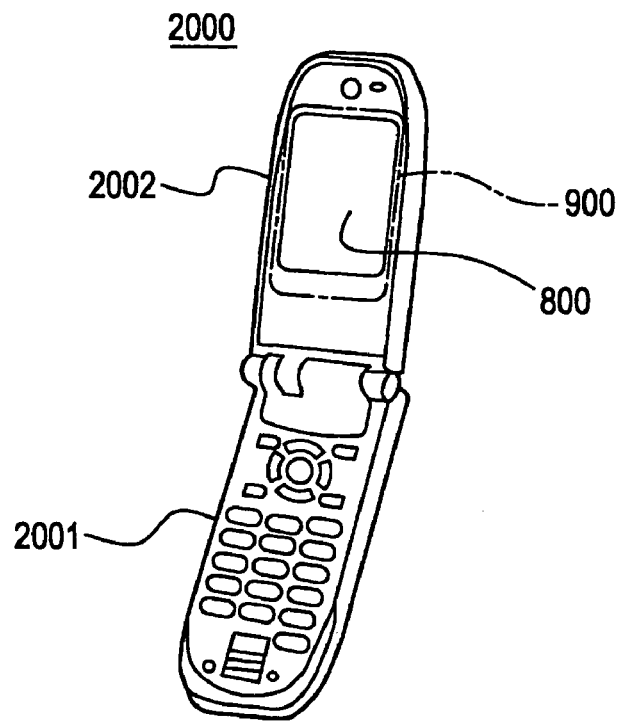
FIG. 13 is a schematic perspective view illustrating the appearance of a cellular phone according to another embodiment of the electronic apparatus.

Further, FIG. 13 is a view illustrating the appearance of a cellular phone according to another embodiment of the electronic apparatus. This cellular phone 2000 includes an operation unit 2001 and a display unit 2002, and an electro-optical device 900 including an illuminating device 100 is disposed in the display unit 2002. Here, the illuminating device 100 is used as a backlight of an electro-optical panel 800, and a display screen of the electro-optical panel 800 can be visibly recognized on the surface of the display unit 2002.

The invention is not limited to the above-mentioned embodiments, but can be appropriately modified without departing from the subject matter and spirit of the invention read in the claims and specification. For example, the electro-optical panel formed of the liquid crystal display body is used in the electro-optical device 900, but a different electro-optical display body capable of performing transmissive display may be used in the electro-optical device 900. Further, the illuminating device 100 is used as the backlight of the electro-optical panel 800, but may be used as a frontlight thereof.

What is claimed is:

1. An illuminating device comprising:
 a plurality of light sources;
 a light guide plate that has plate surfaces on front and rear sides and a plurality of end faces formed around the plate surfaces, receives light emitted from the plurality of light sources through a light incident surface, and emits the light through a light-emitting surface, which is one of the plate surfaces;
 a plurality of photodetectors that each include a light receiving surface which faces the light guide plate and that detects the light from the light guide plate; and
 a light source control unit that controls light emission of the plurality of light sources on the basis of the output of the plurality of photodetectors,
 wherein the plurality of photodetectors include at least two photodetectors, one of the at least two photodetectors being disposed on one of the end faces and another of the at least two photodetectors being disposed on one of the plate surfaces.

2. The illuminating device according to claim 1,
 wherein the light guide plate has a rectangular shape in plan view, and
 the plurality of photodetectors include at least two adjacent photodetectors that have light receiving surfaces that are disposed to face two of the end faces and the plate surfaces of the light guide plate that are adjacent to each other.

3. The illuminating device according to claim 1,
 wherein the light source control unit collectively controls the plurality of light sources on the basis of representative values, which are derived from the detection values detected by the plurality of photodetectors.

4. The illuminating device according to claim 1,
 wherein the light sources control chromaticity of emitted light,
 the photodetectors output detection values with which chromaticity of detected light can be derived, and the light source control unit collectively controls chromaticity of emitted light of the plurality of light sources on the basis of representative values of chromaticity that are derived from the detection values of the plurality of photodetectors.

5. The illuminating device according to claim 1, wherein the light sources control luminance of emitted light, the photodetectors output detection values with which luminance of detected light can be derived, and the light source control unit collectively controls luminance of emitted light of the plurality of light sources on the basis of representative values of luminance that are derived from the detection values of the plurality of photodetectors.

6. An electro-optical device comprising:

the illuminating device according to claim 1; and an electro-optical panel that is disposed on a light emitting side of the illuminating device and functions on the basis of illumination light of the illuminating device.

7. An electronic apparatus comprising the electro-optical device according to claim 6.

8. An illuminating device comprising:

a plurality of light sources;

a light guide plate that has plate surfaces on front and rear sides and a plurality of end faces formed around the plate surfaces, receives light emitted from the plurality of light sources through a light incident surface, and emits the light through a light-emitting surface, which is one of the plate surfaces;

a plurality of photodetectors that each include a light receiving surface which faces the light guide plate and that detects the light from the end faces of the light guide plate; and a light source control unit that controls light emission of the plurality of light sources on the basis of the output of the plurality of photodetectors, wherein the plurality of photodetectors include at least two photodetectors disposed on two different end faces of the plurality of end faces.

9. The illuminating device according to claim 8, wherein the at least two photodetectors are disposed on opposite end faces of the light guide plate, and wherein the at least two photodetectors are not opposed each other.

10. The illuminating device according to claim 8, wherein the at least two photodetectors are disposed on adjacent end faces of the light guide plate.

* * * * *